Patented Apr. 30, 1946

2,399,344

UNITED STATES PATENT OFFICE 2,399,344

ENDOALKYLENE HYDROAROMATIC ACIDS

Henry G. Goodman, Jr., Pittsburgh, Pa., assignor to Carbide and Carbon Chemicals Corporation, a corporation of New York No Drawing. Application August 24, 1943, Serial No. 499,825

10 Claims. (Cl. 260—515)

This invention relates to the production of new aroyl substituted endoalkylene hydroaromatic carboxylic acids and more particularly to ortho aroyl norcamphane carboxylic acids and derivatives thereof.

The new ortho aroyl substituted endoalkylene hydroaromatic carboxylic acids with which this invention is concerned have the general formula

R—CO—R′—COOH wherein R represents an aromatic or alkylated aromatic group and R′ represents an endoalkylene hydroaromatic ring nucleus which may be partially or completely saturated with hydrogen, for instance a norcamphane nucleus.

In general, the new ortho aroyl substituted endoalkylene hydroaromatic carboxylic acids of this invention may be conveniently prepared by condensing, in the presence of a suitable acid condensing agent, such as aluminum chloride, ferric chloride or boron trifluoride, an aryl or aralkyl hydrocarbon with an endoalkylene hydroaromatic orthocarboxylic anhydride. The reactants are dispersed or dissolved in a suitable diluent or solvent and, if desired, an excess of the reacting hydrocarbon itself may serve as the solvent. Both reactants as well as the solvent or diluent should be substantially anhydrous. In effecting solution or dispersion of the reactants some heat may be generated and it is desirable to dissipate such heat by conventional methods so as to maintain the reaction mixture at a temperature preferably not in excess of about 40° to 50° C. After the reactants have been suitably dissolved or dispersed, an anhydrous acidic condensing agent, such as aluminum chloride, is added in small portions to the dispersion or solution while the latter is agitated and maintained at a suitable temperature until approximately 2.2 mols of condensing agent have been added for each mol of endoalkylene hydroaromatic anhydride present. The resulting reaction mass, after a suitable period of agitation at a temperature not in excess of about 70° C., is hydrolyzed by pouring into a mixture of ice and dilute sulfuric acid. Excess solvent or diluent is thereafter removed by steam distillation and the resulting precipitate of crude 2-aroyl endoalkylene hydroaromatic carboxylic acid is filtered, ground, washed with water and dried. If desired, it may be purified by fractional recrystallization from a solution thereof in a suitable organic solvent.

Typical aryl and aralkyl hydrocarbons which may be employed as starting materials include benzene, toluene, ethylbenzene and diphenyl.

For making ortho aroyl substituted endoalkylene hydrophthalic acids in accordance with this invention, the Diels and Alder reaction, described in Patent No. 1,944,731, between maleic anhydride and 1,3-dienes, such as cyclopentadiene, conveniently provides a series of endoalkylene hydrophthalic anhydrides which may be completely hydrogenated to form norcamphane anhydrides. Endoalkylene hexahydroaromatic carboxylic anhydrides or the corresponding tetrahydroaromatic anhydrides may be employed as starting materials with equal success. It is to be understood that the invention is not limited to the use of those endoalkylene hydroaromatic carboxylic anhydrides which have been prepared in accordance with the Diels and Alder teaching, but is adapted to employ successfully any suitable endoalkylene substituted hydroaromatic carboxylic anhydride irrespective of its manner of manufacture. In addition, the endoalkylene group may assume various positions within the hydroaromatic ring nucleus.

By way of illustration, the invention will be described in particular as applied to the preparation of ortho aroyl norcamphane carboxylic acids, but it is to be understood that the invention may be applied to the preparation in general of any ortho aroyl endoalkylene hydroaromatic carboxylic acid.

EXAMPLE I

*2-benzoyl-3-carboxy norcamphane*

(2-benzoyl-3,6-endomethylene hexahydro benzoic acid)

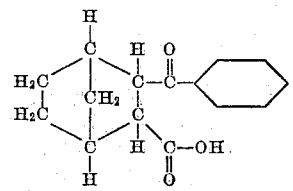

With suitable agitation and cooling 55 parts by weight (0.3 mol) of 2,3-norcamphane-carboxylic anhydride (3,6-endomethylene hexahydrophthalic anhydride) were dissolved in 175 parts (2.2 mols) by weight of benzene. After solution was complete 97 parts by weight (0.7 mol) of anhydrous aluminum chloride were gradually added, in small increments, to the solution while the latter was continuously agitated and maintained between about 40° to 50° C. The resulting reaction mixture, with continuous agitation, was then gradually heated to a temperature of 70° C. and maintained at this temperature for a period of one hour. The reaction mass was then hydrolyzed by pouring into a mixture of ice and dilute sulfuric acid, and such mixture was then steam distilled to remove excess benzene. Crude 2-benzoyl-3-carboxy norcamphane (2-benzoyl-3,6-endomethylene hexahydro benzoic acid) was obtained as a white solid or pasty mass suspended in water. After being filtered, ground, washed with water and dried, 80 parts of this crude product were obtained amounting to a yield of 98%. It was then recrystallized from a solution thereof in ethanol and such purified product was found to melt at 176–178° C.

EXAMPLE II

*2-toluoyl-3-carboxy norcamphane*

(2-toluoyl-3,6-endomethylene hexahydro benzoic acid)

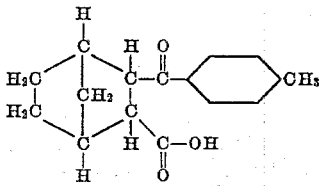

Following the procedure of Example I, 332 parts by weight (2 mols) of 2,3-norcamphane carboxylic anhydride (3,6-endomethylene hexahydrophthalic anhydride) were dissolved in 866 parts (9.4 mols) by weight of toluene and, after cooling in an ice bath, 586 parts by weight (4.4 mols) of anhydrous aluminum chloride were added in small increments, to the resulting solution while the latter was maintained between 10° and 20° C. After a 6 hour period of agitation, the reaction mixture was hydrolyzed in an ice-sulfuric acid mixture and 580 parts of crude, incompletely-dried product, amounting to a yield of 112%, were isolated in the manner described in connection with Example I. This crude 2-toluoyl-3-carboxy norcamphane (2-toluoyl-3,6-endomethylene hexahydro benzoic acid) was twice crystallized from ethanol and when thus purified was found to melt at 163°–165° C.

EXAMPLE III

*2-(ethyl benzoyl)-3-carboxy norcamphane*

(2-(ethyl benzoyl)-3,6-endomethylene hexahydro benzoic acid)

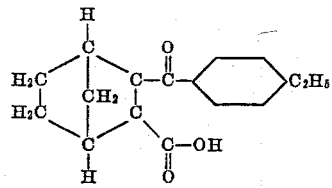

Following the procedure of Example I, 83 parts (0.45 mol) by weight of 2,3-norcamphane carboxylic anhydride (3,6-endomethylene hexahydrophthalic anhydride), 260 parts (2.4 mols) by weight of ethyl benzene, and 146 parts (1.05 mols) by weight of anhydrous aluminum chloride were admixed; the latter was added in small increments while the temperature of the reaction mixture was maintained at about 7° C. The mixture was agitated for two hours at about room temperature and then hydrolyzed in the manner described in Example I. There were recovered 121 parts of crude 2-(ethyl benzoyl)-3-carboxy norcamphane (2-(ethyl benzoyl)-3,6-endomethylene hexahydro benzoic acid) amounting to a yield of 88%. This product was recrystallized from a solution thereof in acetic acid and was found to melt at 148° to 150° C.

EXAMPLE IV

*2-xenoyl-3-carboxy norcamphane*

(2-xenoyl-3,6-endomethylene hexahydro benzoic acid)

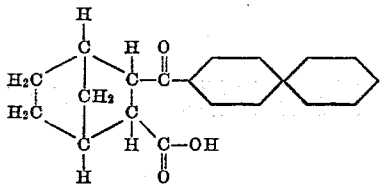

In accordance with the procedure of Example I, 38 parts by weight (0.25 mol) of diphenyl and 41 parts by weight (0.25 mol) of 2,3-norcamphane carboxylic anhydride (3,6-endomethylene hexahydrophthalic anhydride) were dissolved in 300 parts by weight of acetylene tetrachloride as inert solvent. After solution was complete, 73 parts by weight (0.55 mol) of anhydrous aluminum chloride were added in small increments and during such addition the temperature of the mixture was maintained at 20° to 25° C. After stirring for two hours, the reaction mixture was hydrolyzed in accordance with the procedure of Example I, and 78 parts of crude 2-xenoyl-3-carboxy norcamphane (2-xenoyl-3,6-endomethylene hexahydro benzoic acid) amounting to a yield of 97% was obtained. The crude product when recrystallized from a solution thereof in acetic acid was found to melt at 174 to 176° C.

It is to be noted that in the foregoing chemical formulae, substituents in the aromatic ring have been represented as being in the para position. As far as is known, the reaction proceeds in such manner that substituents on the aromatic ring are predominantly in the para position. It is to be understood that the presence of one or more groups in other positions is not necessarily excluded.

Condensation products of the type with which the invention is concerned are soluble in organic solvents and exhibit properties which make them useful as intermediates in the synthesis of plasticizing agents. Plasticizing agents prepared from such products are described in my copending application Serial No. 499,826, filed August 24, 1943.

The above descriptions are intended as illustrations and not as limitations of the invention. In view of the foregoing teachings, variations of the invention may be practiced by one skilled in the art, and such variations are intended to be within the scope of the invention.

What is claimed is:

1. A process for preparing 2-aroyl-3-carboxy norcamphane, which comprises condensing, in the presence of substantially anhydrous aluminum chloride and at a temperature not substantially in excess of 70° C., a 2,3-norcamphane carboxylic anhydride with an aromatic hydrocarbon.

2. A process for preparing 2-aroyl-3-carboxy norcamphane, which comprises condensing, in the presence of substantially anhydrous aluminum chloride, 2,3-norcamphane carboxylic anhydride with an aromatic hydrocarbon selected from the group consisting of benzene, toluene, ethylbenzene and diphenyl, hydrolyzing the resulting reaction mixture and recovering said 2-aroyl-3-carboxy norcamphane.

3. As new chemical compounds, 2-aroyl-3-carboxy norcamphanes.

4. As a new chemical compound, 2-benzoyl-3-carboxy norcamphane.

5. As a new chemical compound, 2-(alkyl benzoyl)-3-carboxy norcamphane.

6. As a new chemical compound, 2-(aryl benzoyl)-3-carboxy norcamphanes.

7. As a new chemical compound, 2-(ethyl benzoyl)-3-carboxy norcamphane.

8. As a new chemical compound, 2-xenoyl-3-carboxy norcamphane.

9. A process for preparing 2-benzoyl-3-carboxy norcamphane which comprises condensing 2,3-norcamphane carboxylic anhydride with benzene in the presence of aluminum chloride at a temperature not in excess of 70° C., hydrolyzing the resulting reaction mixture, and recovering the said 2-benzoyl-3-carboxy norcamphane.

10. A process for preparing 2-benzoyl-3-carboxy norcamphane which comprises condensing 2,3-norcamphane carboxylic anhydride with benzene in the presence of about 2 mols of anhydrous aluminum chloride per mol of 2,3-norcamphane carboxylic anhydride.

HENRY G. GOODMAN, Jr.